UNITED STATES PATENT OFFICE.

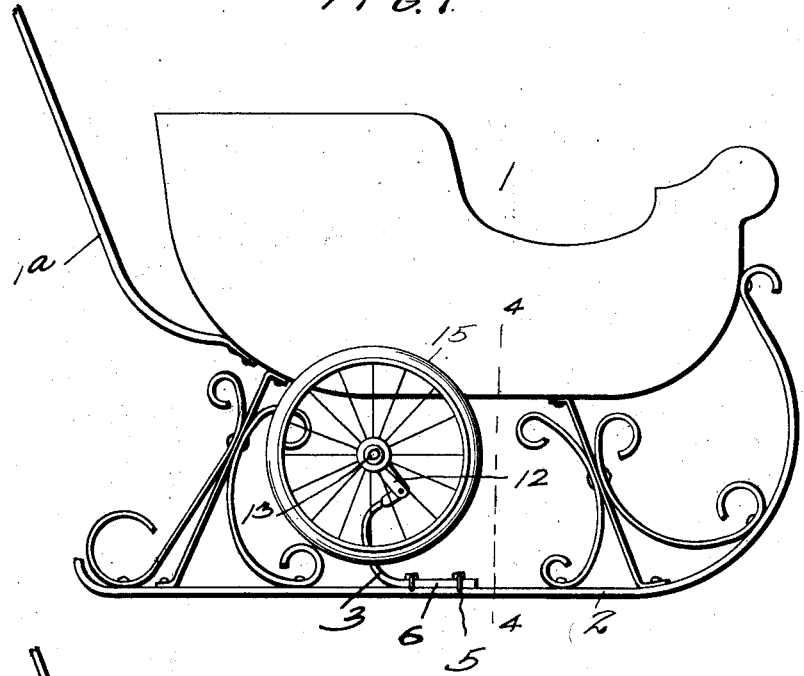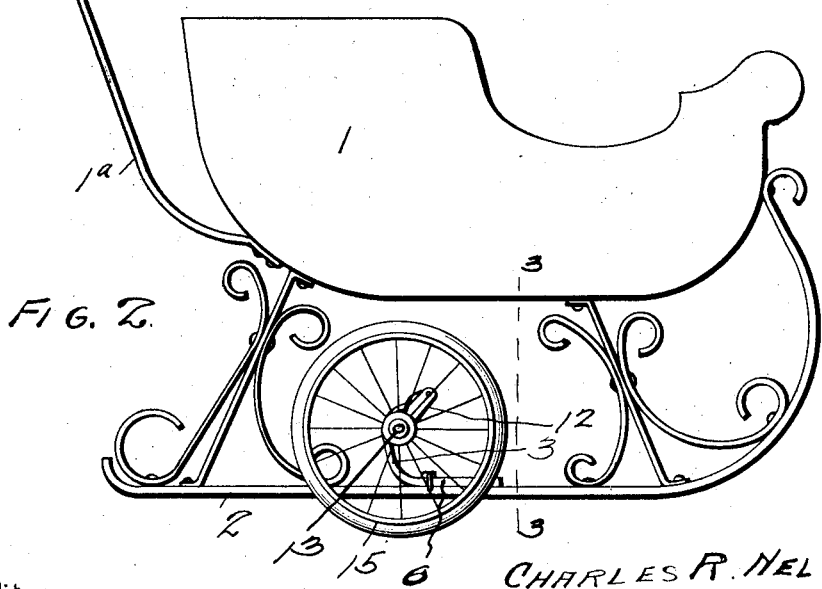

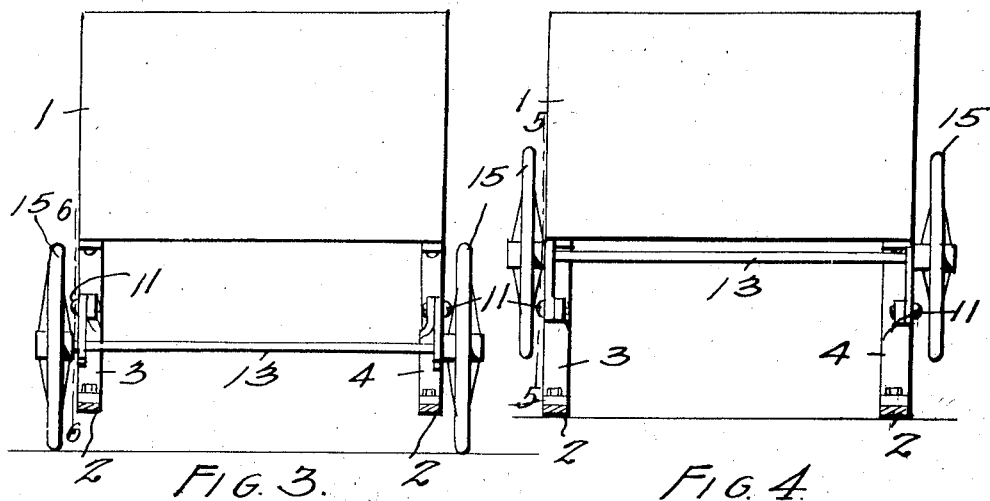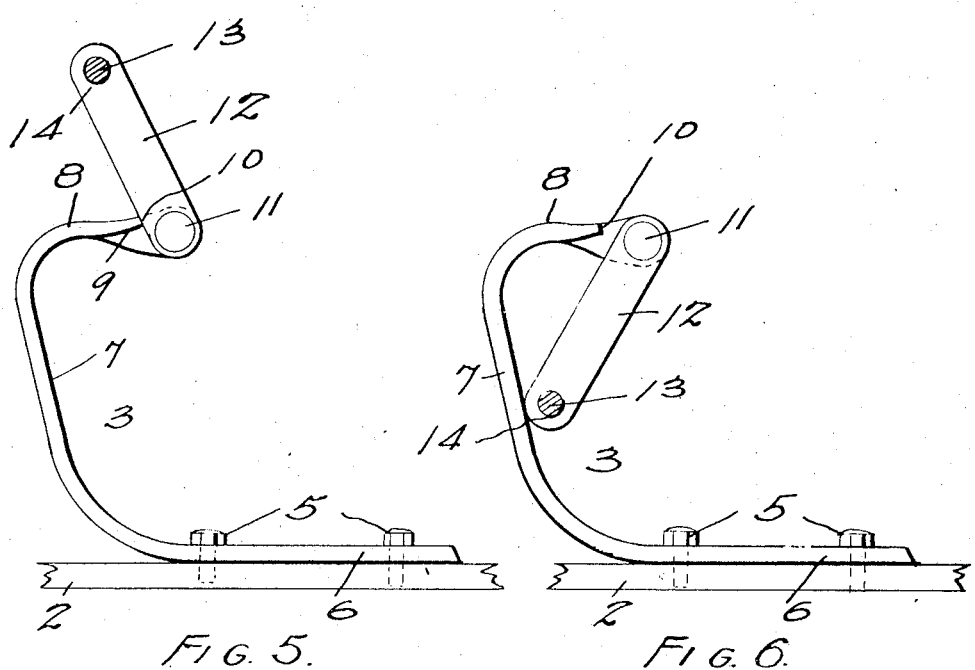

CHARLES R. NELSON, OF MARQUETTE, MICHIGAN.

CONVERTIBLE SLED.

1,335,292.　　　　　Specification of Letters Patent.　　Patented Mar. 30, 1920.

Application filed April 10, 1919. Serial No. 288,953.

*To all whom it may concern:*

Be it known that I, CHARLES R. NELSON, a citizen of the United States of America, residing at Marquette, in the county of Marquette and State of Michigan, have invented certain new and useful Improvements in Convertible Sleds, of which the following is a specification.

The present invention relates to improvements in convertible sleds of the type usually known as "cutters" for babies and children, and the invention is designed to provide a simple but efficient attachment for the sled by which it may with facility be converted for use as a wheeled vehicle. The subject matter of the invention may be utilized in connection with the manufacture of sleds, or the invention may be physically embodied and attached to sleds now in use, the requirements for the mechanical attachment of the devices for the conversion of the sled being quite simple.

The invention contemplates the use of fixed brackets on the runners of the sled, pivoted hangers or links on the brackets, and axles with their wheels carried by the links, and particularly the invention consists in certain novel combinations and arrangements, and novel features of construction whereby the wheels may be moved with facility to adapt the sled as a wheel-runner or as a slide-runner, as will be hereinafter pointed out and claimed.

In the accompanying drawings one complete example of the physical embodiment of the invention is illustrated, constructed and arranged according to the best mode I have so far devised for the practical application of the principles of the invention.

Figure 1 is a side view of the sled on its runners, with the wheels in inoperative position.

Fig. 2 illustrates the sled after it has been converted for use on wheeled-runners.

Fig. 3 is a view of the sled, looking rearwardly, the handles being omitted, and the under gearing being indicated on the line 3—3 of Fig. 2.

Fig. 4 is a similar view at the line 4—4 of Fig. 1 with the wheels uplifted and out of use, the sled resting on its slide runners.

Fig. 5 is a vertical sectional view of the connections on an enlarged scale, taken substantially on line 5—5 of Fig. 4.

Fig. 6 is a similar view taken substantially on line 6—6 of Fig. 3.

The subject matter of the invention is illustrated in connection with the well known "cutter" type of sled as 1, which is provided with a handle 1ª, and the usual metallic runners 2, 2, extending from front to rear and adapted for the sled to slide on in its passage over the surface of the snow, or ice.

In the equipment of a sled with the device of the invention, two fixed brackets, each indicated as a whole by the numerals 3, are used approximately at the center of the sled and carried by the runners 2, 2. The brackets are made of sheets or plates of steel that is readily bent to shape for the purpose, yet strong and of sufficient rigidity to support the weight of the sled, when attached to the runners by the bolts 5 that pass through the bottom plate 6 of the bracket. The plates 6 of the bracket lie closely on the top of the runners, and the bolts 5 firmly hold the brackets, so that the upwardly bent arms 7 of the brackets, which lean or incline toward the front of the sled are capable of sustaining the weight of the sled and its load through the horizontally bent upper arm 8.

At 9 the material of the bracket is twisted so that the perforated arm at its end lies in a vertical plane at right angles to the other portion of the arm 8, and at the end of the twist a shoulder 10, more or less abrupt, is provided for a purpose to be disclosed hereinafter.

Through the medium of a bolt or rivet 11 passing through the perforated end of the arm 8, the swinging link 12 is pivoted in the bracket, the link being also perforated at its end for this purpose, and the link is free to swing on its pivot bolt 11 within the limits of the shoulder 10 and the upwardly bent arm 7 of the bracket. There are two of these links made of plate steel and the free ends of the links, in pairs, support the axle or cross shaft 13 in its bearing openings 14, and the axle of course supports the wheels 15.

The *modus operandi* of the invention will be readily understood from the graphic drawings and the description of the convertible sled, and a short résumé of the action of the invention will clearly set forth its merits.

In Figs. 1 and 5, where the wheels are out of use and uplifted, the weight of the wheels and their axle, is holding the load so that the center of gravity of the axle and its wheels is rearward of the pivot bolt 11 and the weight of the axle and wheels is on the shoulder 10 of the twisted arm 8, and as the links are in close frictional contact with the twisted arm, the links are not likely to move as the sled is pushed forward on its runners, and the friction holds the links against rattling. The wheels are thus held out of the way when not in use, and as they lie close up against the body of the sled while in this position, as seen in Fig. 4, they do not offer any obstruction to the free use of the sled. When the sled is to be uplifted from its runners and supported on the wheels, the pair of wheels are turned back from the position of Fig. 1 to the position of Fig. 2 wherein the weight of the sled is resting on the wheels. In this movement, the links have been swung backward on the bolts 11 as pivots through an arc greater than 180 degrees so that the link carries the axle forward of the pivot bolt 11. In this position the load is supported with the wheels at the rear of the pivot 11, in other words the pivot 11 is to the front of the axle, and of course the load in itself prevents the displacement of the links and holds the parts in proper position against accidental movements with the links braced against the uprights 7.

What I claim is:

1. The combination with the sled and its runners, of brackets attached to the runners and each formed with an upright and a perforated arm projecting at an angle from the upright and having a shoulder, a link pivoted on each arm and swingable above and below the arm, to the same side of the pivot, and engageable with the shoulder in its upper position and an axle with wheels at its ends pivoted in the free ends of the pairs of links.

2. The combination with the sled runners, of brackets attached thereto, each having an upright and an angular arm at its upper end provided with a stop, a link pivoted to each arm and engageable with the stop in its upper position, and an axle and its wheels carried by the free ends of the links, and swingable with the links from the said upper position to a lower position at the same side of the pivot and into engagement with the uprights.

3. The combination with the sled runners, of brackets attached thereto, having angular upper portions, a link pivoted to the angular portion of each bracket, and an axle and its wheels carried by the links, a shoulder on each bracket to support the links and axle with the wheels in the upper position off the ground and the axle at the rear of the link pivots, said links with their wheels and axle being adapted to swing under and to the rear of the link pivots to support the runners above the level of the wheel treads, and being engaged in bracing relation with the brackets in the last mentioned position.

In testimony whereof I affix my signature.

CHARLES R. NELSON.